(12) United States Patent
    Dinant

(10) Patent No.: US 10,926,640 B2
(45) Date of Patent: Feb. 23, 2021

(54) TRIM ELEMENT COMPRISING A DEFORMABLE OUTER SURFACE WITH AN INFORMATION DISPLAY DEVICE

(71) Applicant: FAURECIA INTERIEUR INDUSTRIE, Nanterre (FR)

(72) Inventor: Bruno Dinant, Saint-Brice-sous-Foret (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 78 days.

(21) Appl. No.: 16/280,569

(22) Filed: Feb. 20, 2019

(65) Prior Publication Data

US 2019/0255948 A1   Aug. 22, 2019

(30) Foreign Application Priority Data

Feb. 20, 2018   (FR) ...................................... 1851430

(51) Int. Cl.
    *B60K 37/02*   (2006.01)
    *B60R 13/02*   (2006.01)
    *B60R 11/02*   (2006.01)
    *B60R 11/00*   (2006.01)

(52) U.S. Cl.
    CPC .......... *B60K 37/02* (2013.01); *B60R 11/0235* (2013.01); *B60R 13/02* (2013.01); *B60R 13/0256* (2013.01); *B60R 2011/0005* (2013.01); *B60R 2011/0282* (2013.01); *B60R 2013/0287* (2013.01); *B60R 2013/0293* (2013.01)

(58) Field of Classification Search
    CPC ..... B60K 37/02; B60R 11/0235; B60R 13/02; B60R 13/0256; B60R 2011/0282; B60R 2013/0287; B60R 2013/0293
    See application file for complete search history.

(56) References Cited

U.S. PATENT DOCUMENTS

| 2006/0131088 A1 | 6/2006 | Pawusch et al. |
| 2017/0282812 A1* | 10/2017 | Yoshimura ........... H05K 5/0017 |
| 2019/0202273 A1* | 7/2019 | Hanumanthaiah ...... E04H 15/36 |

FOREIGN PATENT DOCUMENTS

| DE | 102009031618 A1 | 1/2011 |
| DE | 102014009398 A1 | 7/2015 |

OTHER PUBLICATIONS

French Search Report corresponding to FR application No. 1851430, dated Jul. 27, 2018, 3 pages.
French Written Opinion corresponding to FR application No. 1851430, dated Feb. 20, 2018, 5 pages.

* cited by examiner

*Primary Examiner* — Lori L Lyjak
(74) *Attorney, Agent, or Firm* — Reising Ethington P.C.

(57) ABSTRACT

A vehicle trim element having a body defining the outer surface of the trim element. At least part of the body is deformable so as to cause a modification of the shape of the outer surface. The body includes a deformable guide surface extending in a first direction (Y). The trim element further includes at least one actuating element cooperating with the guide surface in an actuating zone, the guide surface adopting the shape of the actuating element in the actuating zone. The actuating element is movable relative to the body in the first direction (Y) such that the body deforms when the actuating element is moved. The actuating element is formed by a part of an information display device.

12 Claims, 4 Drawing Sheets

TRIM ELEMENT COMPRISING A DEFORMABLE OUTER SURFACE WITH AN INFORMATION DISPLAY DEVICE

FIELD OF THE INVENTION

The present invention relates to a vehicle trim element comprising a body defining the outer surface of the trim element.

BACKGROUND

Such a trim element is for example intended to be incorporated into a vehicle, for example a motor vehicle, more particularly in the driver's station, to form a dashboard body of the vehicle.

Document US 2006 0131088 A1 describes a screen arranged on the front of the dashboard. The screen is movable along a horizontal direction of the dashboard. This in particular allows the driver or front passenger to move the screen to see it better.

However, in such a configuration, the surface of the dashboard facing the passenger compartment is partially hidden by the screen. More particularly here, the surface of a CD player is hidden by the screen when the latter is in the extreme position closest to the driver.

Furthermore, the screen protrudes relative to the dashboard, which is not esthetically satisfactory.

SUMMARY

One aim of the invention is to allow optimal integration of the screen within the rest of the trim element in all possible configurations.

To that end, the invention relates to a trim element of the aforementioned type, wherein at least part of said body is deformable, the deformation of said part of the body causing a change in the shape of the outer surface of the trim element, said body comprising a deformable guide surface extending in a first direction, the trim element being characterized in that it further comprises at least one actuating element extending in the first direction, said actuating element cooperating with the guide surface in an actuating zone, the guide surface adopting the shape of the actuating element in said actuating zone, the actuating element being movable relative to the body in the first direction such that the actuating zone is movable and the body deforms when the actuating element is moved in the first direction relative to the body, the actuating element being formed by part of an information display device.

Using an actuating element that is movable relative to the body to change the shape thereof makes it possible to have an identical rigidity for the entire outer surface, namely inside and outside the actuating zone. Furthermore, this makes it possible to adapt the shape of the outer surface of the trim element to the shape of the display device for better integration of said display device, in particular to improve the holding of the display device within the trim element and/or the esthetic appearance of the trim element.

Embodiments of the invention may include the following optional features of the trim element, considered alone or according to any technically possible combination:

the actuating element comprises a screen arranged on a first face and protruding from the outer surface of the trim element, the actuating zone being arranged on a second face opposite the first face in a direction perpendicular to the first direction;

the actuating element in the actuating zone has a profile provided to apply a progressive force on the guide surface during a movement;

the actuating element in the actuating zone has, in all points, a local tangent forming an angle smaller than 45° with the first direction;

the guide surface comprises a series of strips adjacent to one another in the first direction, each strip being deformable relative to the rest of the body in a second direction substantially perpendicular to the first direction, the actuating zone extending over at least two of said strips;

the guide surface comprises a foam extending over the strips and secured to the strips and able to be deformed, the foam extending between the strips and the actuating element in the actuating zone;

the body comprises a substrate having a stationary part and a deformable part, the strips being defined in the deformable part, the substrate being formed in one piece;

the stationary part and the deformable part are connected by a connecting part, the connecting part having a Z-shaped profile along the entire plane perpendicular to the first direction, said connecting part extending in the first direction;

the trim element comprises at least one pressure element provided across from the actuating element, the guide surface extending between the actuating element and the pressure element in the actuating zone;

the pressure element is a roller, or a counter-shape, able to be moved in the first direction simultaneously with the actuating element.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
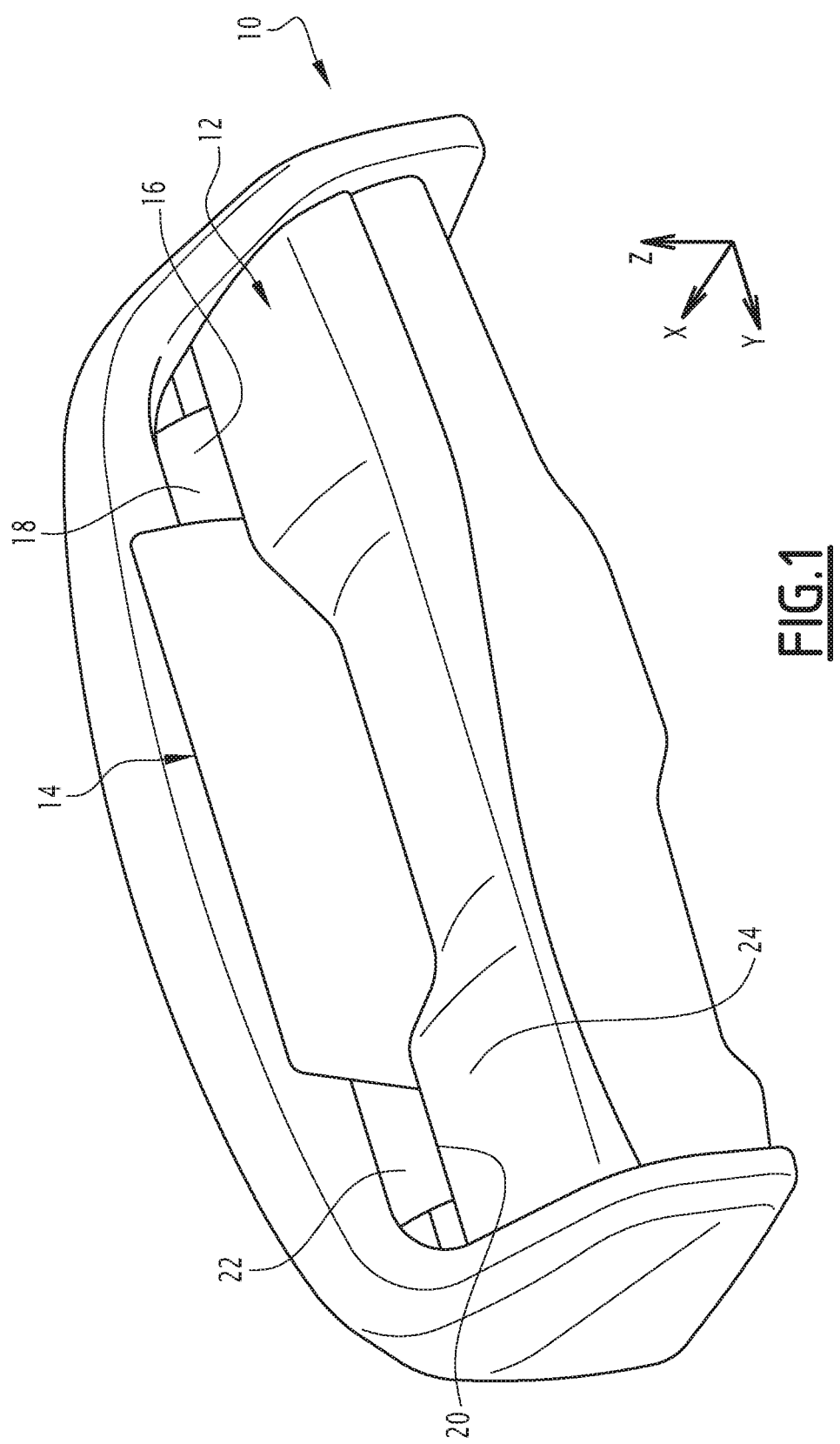
FIG. 1 is a schematic perspective illustration of a trim element according to an embodiment of the invention.

An example trim element 10 according to the invention is shown in FIG. 1.

The trim element 10 is for example integrated into a vehicle, more particularly into a driver's station of a vehicle, and for example forms a dashboard of the vehicle. The invention is, however, suitable for the trim of other parts of the passenger compartment of the vehicle, such as a door, a seat or the like.

An elevation direction Z is defined, for example, in the usual direction in a vehicle, i.e., the direction perpendicular to the rolling plane of the vehicle in which the trim element is intended to be installed. The terms "top", "bottom" and "horizontal" are defined in the elevation direction Z in the usual way.

The longitudinal X and transverse Y directions are also defined perpendicular to the elevation direction Z in the usual way in a vehicle. The expressions "front" and "rear", "left" and "right" will be used hereinafter relative to the normal movement direction of the vehicle.

In the rest of the description, the first direction will be considered to be the transverse direction Y and the second direction to be the elevation direction Z. It is, however, understood that the first and second directions can be other directions of the vehicle.

The trim element 10 comprises a body 12 and an information display device 14.

The body 12 defines the shape of an outer surface 16 of the trim element 10, i.e., the visible surface of the trim element 10, for example from the passenger compartment of the vehicle in which the trim element 10 is installed. "Defines the outer surface" means that the outer surface 16 follows the shape of a surface of the body 12. In other words, the outer surface 16 can be formed by the body 12 or by a decorative layer extending over the body 12 and adopting the shape of a surface of the body 12.

The body 12 is for example a vehicle dashboard body or a door panel or the like.

The body 12 also defines a slot 20 extending primarily in a first direction, corresponding in the illustrated example to the transverse direction Y. The slot 20 is hollowed relative to the outer surface 16 in a second direction, the second direction being perpendicular to the first direction and here having an angle smaller than 20° with the elevation direction Z. According to one embodiment, the second direction corresponds to the elevation direction Z.

The slot 20 delimits a front part 22 of the body 12, located in front relative to the slot 20, and a rear part 24 of the body 12, located behind relative to the slot 20.

At least one zone 18 of the body 12 is deformable under the effect of an actuation, such that the shape of the outer surface 16 can be changed in the deformable zone 18. The deformation is for example resilient, so that the deformable zone 18 regains its initial shape without the actuation.

The deformable zone 18 at least partially defines one side of the slot 20, more particularly here the front of the slot 20. A surface of the deformable zone 18 of the body 12, more particularly a surface facing the slot 20, then defines a deformable guide surface.

According to one embodiment not described in detail hereinafter, the body 12 is made deformable by the material from which the deformable zone 18 is made, for example a resilient material.

Figure 2:
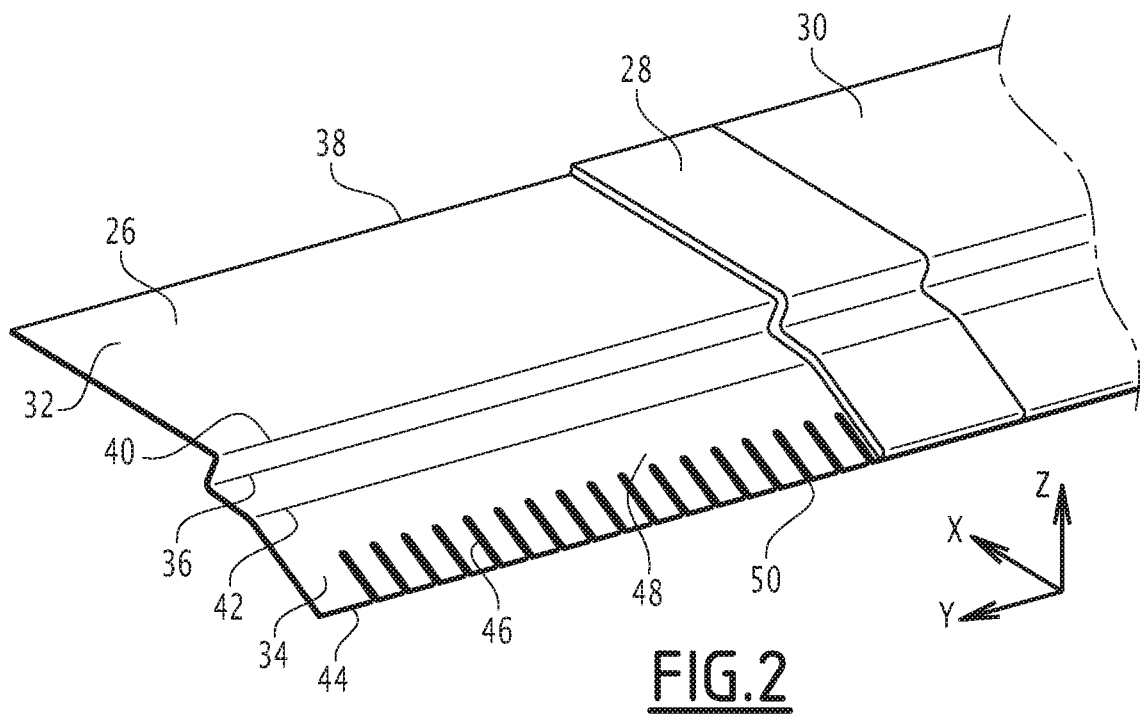
FIG. 2 is a cutaway schematic perspective illustration of the front part of the body of the trim element of FIG. 1 having a first shape.
Figure 3:
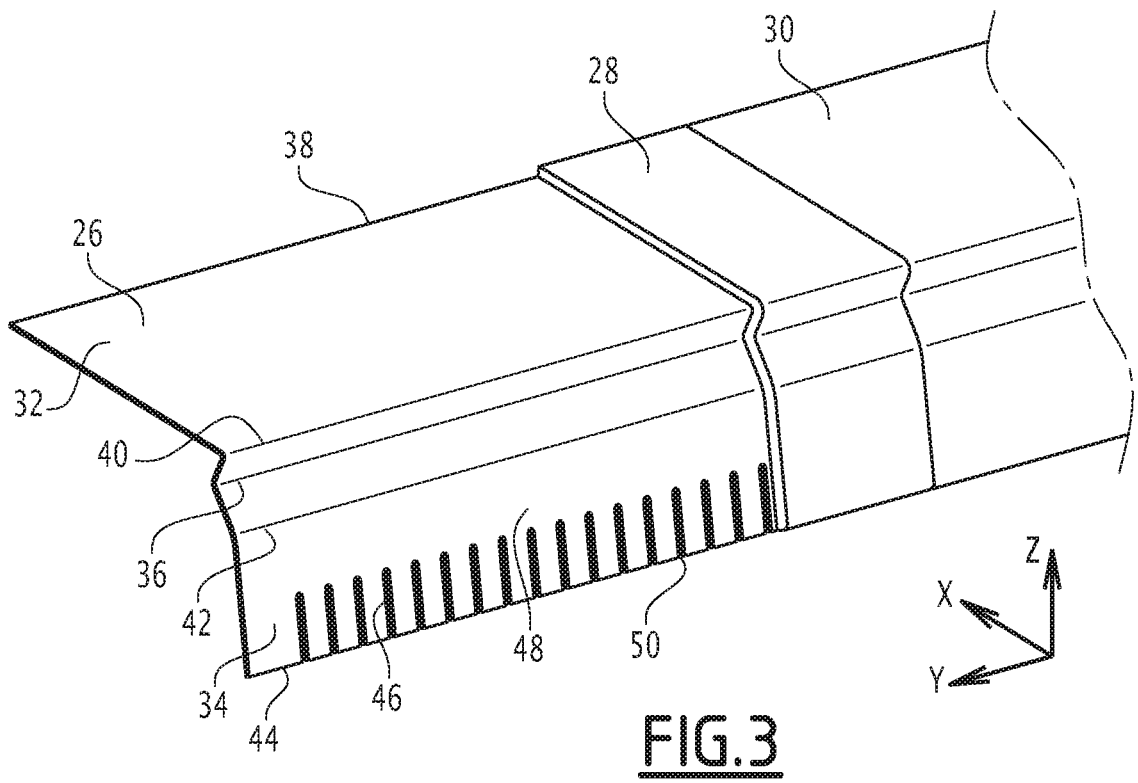
FIG. 3 is a cutaway schematic perspective illustration of the front part of FIG. 2 having a second shape.
Figure 4:
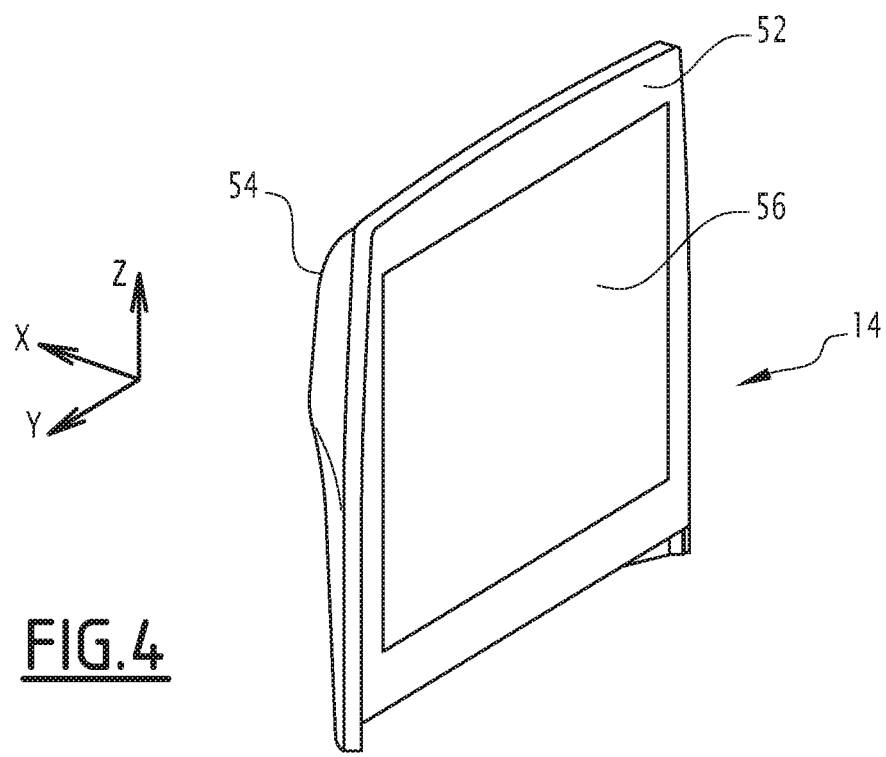
FIG. 4 is a schematic perspective illustration of the display device of FIG. 1.
Figure 5:
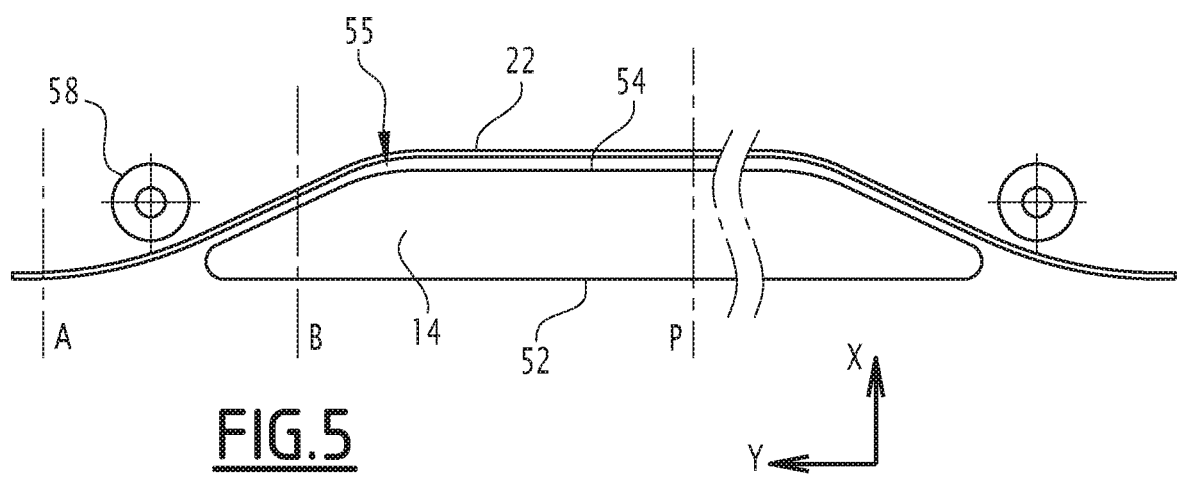
FIG. 5 is a schematic sectional illustration of the trim assembly at the actuating zone.

In the example shown in FIGS. 2 and 3, the front part 22 comprises a substrate 26 and advantageously a foam 28 and a decorative layer 30.

The substrate 26 gives the front part 22 of the body 12 its shape at least in the deformable zone 18.

The substrate 26 here comprises a stationary part 32 and a deformable part 34.

The deformable part 34 here corresponds to the deformable zone 18 of the body 12 and extends across from the slot 20.

The stationary part 32 and the deformable part 34 are connected by a connecting part 36. The stationary part 32 and the deformable part 34 extend opposite one another from the connecting part 36 along the longitudinal direction X.

The stationary part 32 thus extends toward the front, and optionally along the sides in the first direction, of the deformable part 34.

The substrate 26 here is formed in a single part. Alternatively, the stationary part 32 and the deformable part 34 are two separate parts connected by the connecting part 36.

The substrate is for example made from plastic such as polycarbonate/Acrylonitrile Butadiene Styrene (PC-ABS) or polypropylene (PP) or a composite material such as carbon fibers embedded in a matrix of plastic.

The stationary part 32 is a substantially rectangular plate having first and second so-called transverse sides 38, 40, i.e., extending in the transverse direction Y. The stationary part 32 for example has an angle smaller than 30° with a horizontal plane.

Alternatively, the stationary part 32 has a curvature along the longitudinal direction X.

The stationary part 32 is not deformable. Furthermore, here it has no orifices or reliefs.

The stationary part 32 is for example attached to a structural part (not shown) of the vehicle, more particularly at the first transverse side 38.

The connecting part 36 has a Z-shaped profile in the transverse direction.

The connecting part 36 is connected on the one hand to the second transverse side 40 of the stationary part 32 and on the other hand to the deformable part 34.

The deformable part 34 is globally in the form of a substantially rectangular plate, having first and second so-called transverse sides 42, 44, i.e., extending in the transverse direction Y, said sides being spaced apart from one another in the longitudinal direction X.

The first transverse side 42 of the deformable part 34 is connected to the connecting part 36.

The second transverse side 44 of the deformable part 34 is free and here forms a transverse edge of the substrate 26.

The deformable part 34 comprises a series of strips 46 each extending for example along a respective direction, for example the longitudinal direction. They are adjacent to one another in the first direction, here corresponding to the transverse direction Y. Each strip 46 is deformable relative to the rest of the body in a deformation direction substantially perpendicular to the first direction. The strips 46 here are parallel to one another when there is no deformation.

The strips 46 form part of the substrate 26. Each strip 46 is for example defined in the substrate 26 over its entire thickness, more particularly in the deformable part 34. Each strip 46 comprises a first end 48 secured to the rest of the substrate 26 and a free second end 50, forming part of the second transverse side 44 of the deformable part 34 and therefore a transverse edge of the substrate.

Due to its shape, each strip 46 is deformable relative to the rest of the body in the deformation direction, for example the elevation direction Z, for example by rotation around a transverse axis passing near the first end 48. Thus, by exerting pressure on the second free end 50, it is possible to move each strip 46 relative to the rest of the substrate 26, such that the strip 46 extends in a different plane from the nondeformed strips when it is deformed.

The shape and material of the strips 46 are such that the deformation of the strips is resilient. The strips 46 are for example obtained by cutting of the substrate 26 or by molding in a single substantially rigid material by injecting a plastic material. The number of strips is in particular adapted based on the dimensions of the zone to be deformed and the width of the strips.

The foam 28 extends over the strips 46. More particularly here, the foam 28 extends over the entire substrate on top of said substrate 26. More particularly, the foam 28 is preferably glued or overmolded on the substrate 26.

The foam 28 marries the shape of the substrate 26.

The foam 28 is secured to the strips 46 and able to be deformed with the strips 46. The foam 28 is flexible, i.e., it can deform with the strips 46 without breaking the foam.

The foam 28 has a substantially constant thickness.

The foam 28 is for example made from polyurethane.

The decorative layer 30 extends over the foam 28 so as to cover the upper surface of the assembly formed by the foam 28 and the substrate 26. The decorative layer 30 is secured to the foam 28 and is able to be deformed with the foam 28 and thus with the strips 46. The decorative layer 30 is preferably flexible, i.e., it can deform and return to its initial shape without deteriorating.

The decorative layer 30 imparts its outside visual appearance to the front part 22. It is for example made from leather, imitation leather, fabric or a layer with a wood effect. The decorative layer 30 may have a visible pattern.

Thus, the body 12 is made deformable by the material and the shape of the deformable zone 18, more particularly the deformable part 34 of the substrate 26.

The presence of the connecting part 36, relative to a rectangular plate, in particular makes it possible to reduce the forces to be applied on the body 12 to cause a deformation thereof.

Figure 6:
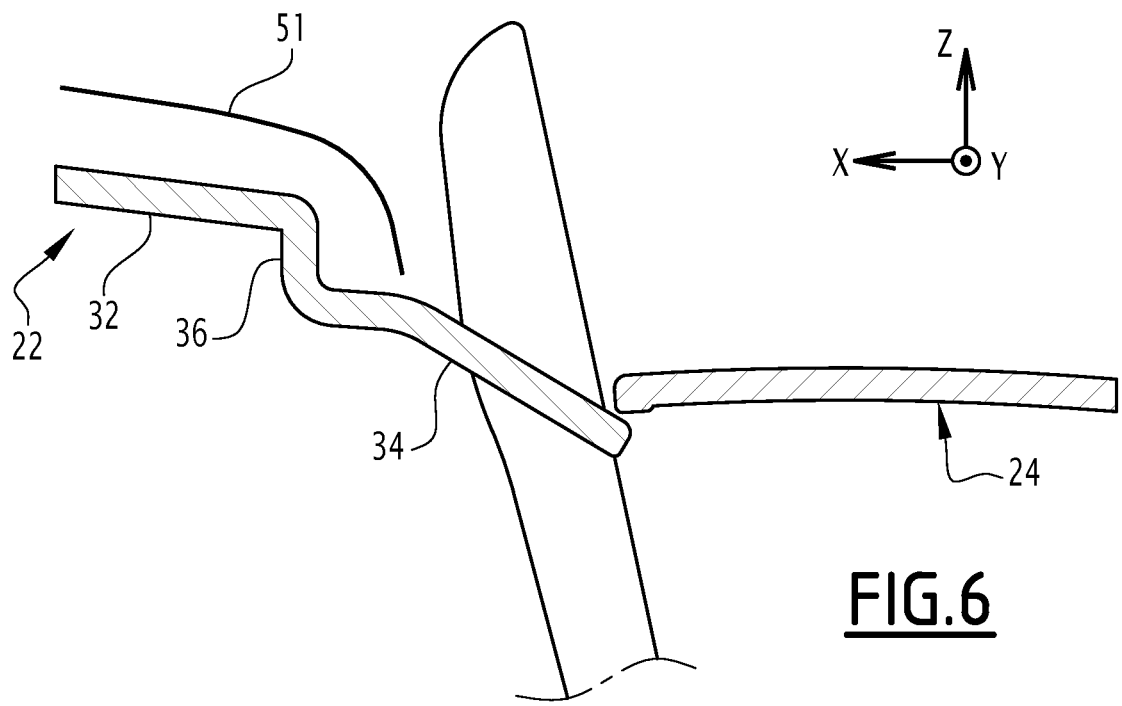
FIG. 6 is a schematic sectional illustration along axis A shown in FIG. 5 of the trim element of FIG. 1.
Figure 7:
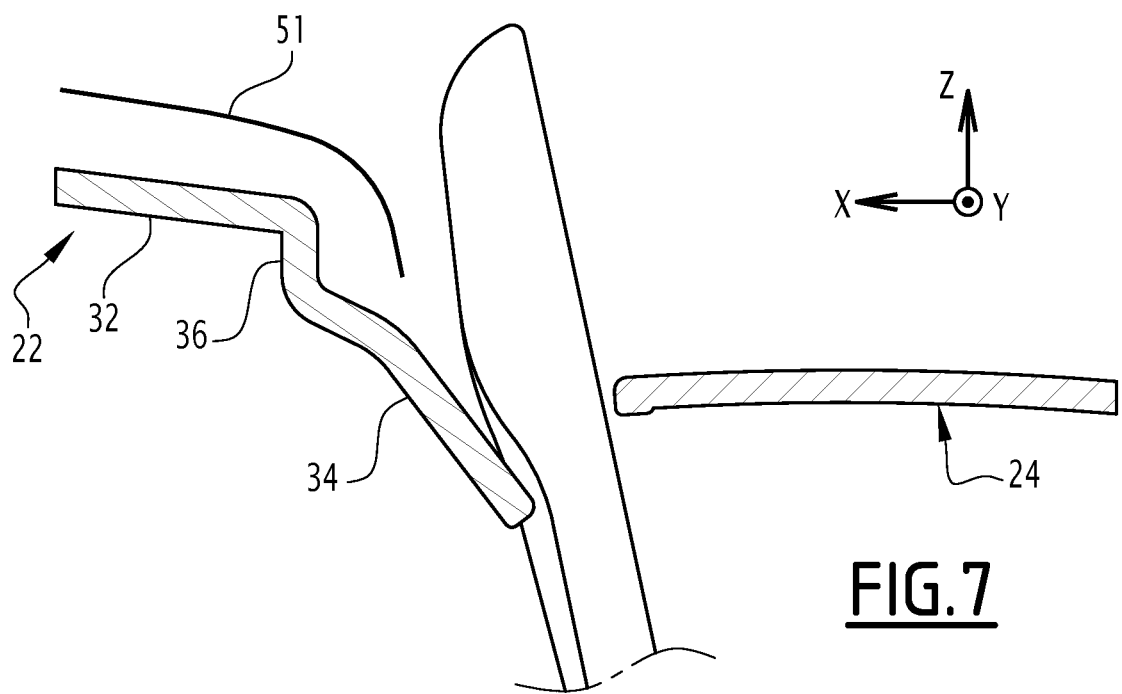
FIG. 7 is a schematic sectional illustration along axis B shown in FIG. 5 of the trim element of FIG. 1.

The trim element 10 here also comprises a cover 51, visible in FIGS. 6 and 7, provided to partially cover the body 12 outside the deformable zone 18, more particularly the stationary part 32 and the connecting part 34 of the substrate 26, as well as the associated parts of the foam 28 and the decorative layer 30.

The display device 14 is arranged in the slot 20 of the body 12 and here extends primarily in the first and second directions.

The display device is symmetrical along a median plane comprising the longitudinal X and elevation Z directions.

The display device has a rear face 52 and a front face 54 that are opposite in a direction perpendicular to the first direction, more particularly opposite in the longitudinal direction X. The rear face 52 faces the passenger compartment of the vehicle.

The display device 14 is in contact with the body 12. Part of the display device 14, more particularly the front face 54, forms an actuating element, said actuating element cooperating with the guide surface in an actuating zone 55. The guide surface adopts the shape of the actuating element in said actuating zone 55.

The actuating zone 55 is located on the front face 54 of the display device 14.

The actuating zone 55 here is located over the entire dimension in the first direction of the front face 54 at mid-height in the second direction to within 10% of the dimension of the display device 14 in the second direction.

The rear face 52 is planar and extends in the first and second directions.

The display system 14 includes at least one screen 56, more particularly a single screen. The screen extends over the rear face 52 of the display device 14.

The front face 54 extends non-rectilinearly in the first direction, here corresponding to the transverse direction Y, at least in the actuating zone 55.

The actuating element in the actuating zone 55 has a profile provided to apply a progressive force on the guide surface during a movement. The actuating element in the actuating zone 55 has, in all points, a local tangent forming an angle smaller than 45° with the first direction.

The actuating element has a spindle-shaped profile such that the thickness of the display device 14 increases gradually in the first direction Y from each end.

More particularly, in the actuating zone 55, the front face 54 has a domed profile. In the example shown in FIG. 3, the thickness of the display device 14 increases strictly in the first direction from each end, then remains constant in a median part.

Since the front face extends non-rectilinearly in the actuating zone in the first direction in the actuating zone, it is understood that the strips 46 cooperating with the actuating zone are deformed to extend in the same plane as the part with which they cooperate. This causes a deformation of the outer surface 16 of the trim element 10, as shown in FIG. 3.

It will be noted that the deformed zone retains a certain rigidity, since it is bearing on the actuating element, which is rigid. Thus, the feel and the mechanical strength of the outer surface 6 are substantially the same over the entire surface, including in the deformed zone.

Furthermore, the display device 14 is able to be moved in the first direction relative to the body 12. More particularly, the display system 14 is movable in the slot 20 of the body 12.

Thus, the actuating zone 55 is movable. The body 12 deforms when the actuating element 55 is moved in the first direction relative to the body 12.

Advantageously, the trim element 10 further comprises at least one pressure element 58 provided across from the actuating element, the guide surface extending between the actuating element and the pressure element 58 in the actuating zone 55. More particularly here, the trim element 10 comprises a pressure element on each side of the actuating zone 55 in the first direction Y.

The pressure element is able to be moved in the first direction simultaneously with the actuating element, so as to accompany the deformation of the strips 46.

This makes it possible to press the body 12 against the front face 54 of the display device 14 so as not to have space between the body 12 and the display device 14.

The pressure element 58 here is a cylindrical roller, for example, able to pivot on itself around an axis extending substantially in the second direction.

Alternatively, the pressure element 58 can be a countershape.

The movement of the display device 14 is for example commanded by the control electronics of the vehicle, which makes it possible to move the display device 14 in a synchronized manner with other elements of the vehicle, such as a seat, footrest and/or armrest.

Advantageously, a deformation of the trim element as described in the example embodiment is combined with a deformation of the rear part to form a hollow across from the screen, said deformation following the movement of the screen. Such a deformation may also be done by a deformable zone of the rear part of the trim element, the deformable zone cooperating with an actuating element able to move such that the hollow remains across from the screen.

The movement of the display device 14 can also be commanded by a pneumatic or manual system.

The movement of the display system 14 makes it possible to adapt the environment of the vehicle depending on a user's needs.

Furthermore, the deformation of the outer surface makes it possible to integrate the display system dynamically into the trim element.

More particularly, the deformation of the front part of the trim element in particular makes it possible for the rear part to follow the movement of the moving display device, which in particular allows better maintenance of the display device within the trim element, more particularly in the slot, and a pleasing esthetic appearance due to the fact that the curvature of the front part follows the curvature formed by the front face of the display device. For example, the slot closes in a direction perpendicular to the first and second directions outside the actuating device.

The invention claimed is:

1. A vehicle trim element comprising a body defining the outer surface of the trim element, at least part of said body being deformable, the deformation of said part of the body causing a change in the shape of the outer surface of the trim element, said body comprising a deformable guide surface extending in a first direction,
   wherein the trim element further comprises at least one actuating element extending in the first direction, said actuating element cooperating with the deformable guide surface in an actuating zone, the deformable guide surface adopting the shape of the actuating element in said actuating zone, the actuating element being movable relative to the body in the first direction such that the actuating zone is movable and the body deforms when the actuating element is moved in the first direction relative to the body, the actuating element being formed by part of an information display device,
   wherein the actuating element in the actuating zone has a profile provided to apply a progressive force on the deformable guide surface during a movement, and
   wherein the actuating element in the actuating zone, in all points, a local tangent forming an angle smaller than 45° with the first direction.

2. The trim element according to claim 1, wherein the actuating element comprises a screen arranged on a first face and protruding from the outer surface of the trim element, the actuating zone being arranged on a second face opposite the first face in a direction perpendicular to the first direction.

3. The trim element according to claim 1, wherein the deformable guide surface comprises a series of strips adjacent to one another in the first direction, each strip being deformable relative to the rest of the body in a second direction substantially perpendicular to the first direction, the actuating zone extending over at least two of said strips.

4. The trim element according to claim 3, wherein the deformable guide surface comprises a foam extending over the strips and secured to the strips and able to be deformed, the foam extending between the strips and the actuating element in the actuating zone.

5. The trim element according to claim 3, wherein the body comprises a substrate having a stationary part and a deformable part, the strips being defined in the deformable part, the substrate being formed in one piece.

6. The trim element according to claim 5, wherein the stationary part and the deformable part are connected by a connecting part, the connecting part having a Z-shaped profile along the entire plane perpendicular to the first direction, said connecting part extending in the first direction.

7. The trim element according to claim 4, wherein the body comprises a substrate having a stationary part and a deformable part, the strips being defined in the deformable part, the substrate being formed in one piece.

8. The trim element according to claim 7, wherein the stationary part and the deformable part are connected by a connecting part, the connecting part having a Z-shaped profile along the entire plane perpendicular to the first direction, said connecting part extending in the first direction.

9. The trim element according to claim 1, comprising at least one pressure element provided across from the actuating element, the deformable guide surface extending between the actuating element and the pressure element in the actuating zone.

10. The trim element according to claim 9, wherein the pressure element is a roller, or a counter-shape, able to be moved in the first direction simultaneously with the actuating element.

11. A vehicle trim element comprising a body defining the outer surface of the trim element, at least part of said body being deformable, the deformation of said part of the body causing a change in the shape of the outer surface of the trim element, said body comprising a deformable guide surface extending in a first direction,
   wherein the trim element further comprises at least one actuating element extending in the first direction, said actuating element cooperating with the deformable guide surface in an actuating zone, the deformable guide surface adopting the shape of the actuating element in said actuating zone, the actuating element being movable relative to the body in the first direction such that the actuating zone is movable and the body deforms when the actuating element is moved in the first direction relative to the body, the actuating element being formed by part of an information display device,
   wherein the deformable guide surface comprises a series of strips adjacent to one another in the first direction, each strip being deformable relative to the rest of the body in a second direction substantially perpendicular to the first direction, the actuating zone extending over at least two of said strips, and
   wherein the body comprises a substrate having a stationary part and a deformable part, the strips being defined in the deformable part, the substrate being formed in one piece.

12. A vehicle trim element comprising a body defining the outer surface of the trim element, at least part of said body being deformable, the deformation of said part of the body causing a change in the shape of the outer surface of the trim element, said body comprising a deformable guide surface extending in a first direction,
   wherein the trim element further comprises at least one actuating element extending in the first direction, said actuating element cooperating with the deformable guide surface in an actuating zone, the deformable guide surface adopting the shape of the actuating element in said actuating zone, the actuating element being movable relative to the body in the first direction such that the actuating zone is movable and the body deforms when the actuating element is moved in the first direction relative to the body, the actuating element being formed by part of an information display device, and
   the trim element comprising at least one pressure element provided across from the actuating element, the deformable guide surface extending between the actuating element and the pressure element in the actuating zone.

* * * * *